US009835741B1

(12) United States Patent
Brubaker et al.

(10) Patent No.: US 9,835,741 B1
(45) Date of Patent: Dec. 5, 2017

(54) SINGLE VOLUME FISSION ENERGY NEUTRON DETECTOR

(71) Applicant: Sandia Corporation, Albuquerque, NM (US)

(72) Inventors: Erik Brubaker, Oakland, CA (US); Peter Marleau, Dublin, CA (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 506 days.

(21) Appl. No.: 14/327,438

(22) Filed: Jul. 9, 2014

(51) Int. Cl.
  *G01T 1/20*  (2006.01)
  *G01T 3/06*  (2006.01)
  *G01T 3/08*  (2006.01)

(52) U.S. Cl.
  CPC . *G01T 3/06* (2013.01); *G01T 3/08* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 5,900,627 | A * | 5/1999 | Odom | G01V 5/12 250/269.6 |
| 6,580,079 | B1 * | 6/2003 | Craig | G01N 23/005 250/390.04 |
| 6,754,586 | B1 * | 6/2004 | Adolph | G01V 5/10 702/8 |
| 7,405,404 | B1 * | 7/2008 | Shah | C09K 11/7719 250/361 R |
| 7,741,613 | B1 | 6/2010 | Mascarenhas et al. | |
| 7,902,513 | B2 | 3/2011 | Kub et al. | |
| 8,237,130 | B1 | 8/2012 | Mascarenhas et al. | |
| 8,258,483 | B1 * | 9/2012 | Boatner | G01T 1/201 250/367 |
| 8,389,941 | B2 * | 3/2013 | Bendahan | G01T 1/167 250/363.02 |
| 8,963,094 | B2 * | 2/2015 | Gozani | G01T 1/203 250/363.02 |
| 9,310,513 | B2 * | 4/2016 | Scoullar | G01T 1/171 |

(Continued)

OTHER PUBLICATIONS

Ziock, 3D millimeter Event Localization in Bulk Scintillator Crystals, IEEE Transaction on Nuclear Science, vol. 60, No. 2, Apr. 2013, 1390-1399.*
Hayes, Scintillator Based Coded-Aperture Imaging for Neutron Detection, IEEE, 2013.*
Ziock, et al., "3D Millimeter Event Localization in Bulk Scintillator Crystals", IEEE Transactions on Nuclear Science, vol. 60, No. 2, Apr. 2013, pp. 1390-1399.
Ziock, et al., "The Other End of the Scale: Coded Apertures in the Near Field for High Resolution 3D Gamma Event Localization in Bulk Scintillators", Proc. of SPIE, vol. 8542, Nov. 19, 2012, 12 pages.

*Primary Examiner* — David Porta
*Assistant Examiner* — Djura Malevic
(74) *Attorney, Agent, or Firm* — Medley, Behrens & Lewis, LLC

(57) ABSTRACT

A single volume fission energy neutron detector is described herein. The detector includes a single volume of scintillator. A photodetector is positioned adjacent to a surface of the scintillator, wherein the photodetector has relatively small spatial resolution corresponding thereto and relatively small temporal resolution corresponding thereto. Based upon values read out from detection bins of the photodetector, kinematics of a neutron that interacted with scintillating material of the scintillator are reconstructed. Based upon the kinematics (of the neutron and other detected neutrons), a location of material from which the neutron was emitted is ascertained, and an image of the material is generated.

20 Claims, 11 Drawing Sheets

(56) References Cited

U.S. PATENT DOCUMENTS

| | | | |
|---|---|---|---|
| 2004/0227098 A1 | 11/2004 | Tarabrine | |
| 2006/0011849 A1* | 1/2006 | Tseng | G01T 1/167 250/367 |
| 2006/0017000 A1* | 1/2006 | Martoff | G01T 3/00 250/390.02 |
| 2006/0202125 A1* | 9/2006 | Suhami | B82Y 20/00 250/368 |
| 2007/0057194 A1* | 3/2007 | Ryan | G01T 1/20 250/390.11 |
| 2009/0078881 A1* | 3/2009 | Dangendorf | G01T 1/201 250/390.11 |
| 2013/0146775 A1* | 6/2013 | Ramsden | G01T 3/06 250/362 |
| 2013/0256520 A1 | 10/2013 | Korkin et al. | |
| 2013/0264482 A1 | 10/2013 | Yamane et al. | |
| 2014/0014842 A1* | 1/2014 | Ryan | G01T 1/20 250/362 |
| 2014/0077089 A1* | 3/2014 | Orava | G01T 3/08 250/370.05 |
| 2014/0209805 A1* | 7/2014 | Stowe | G01T 1/2023 250/362 |

\* cited by examiner

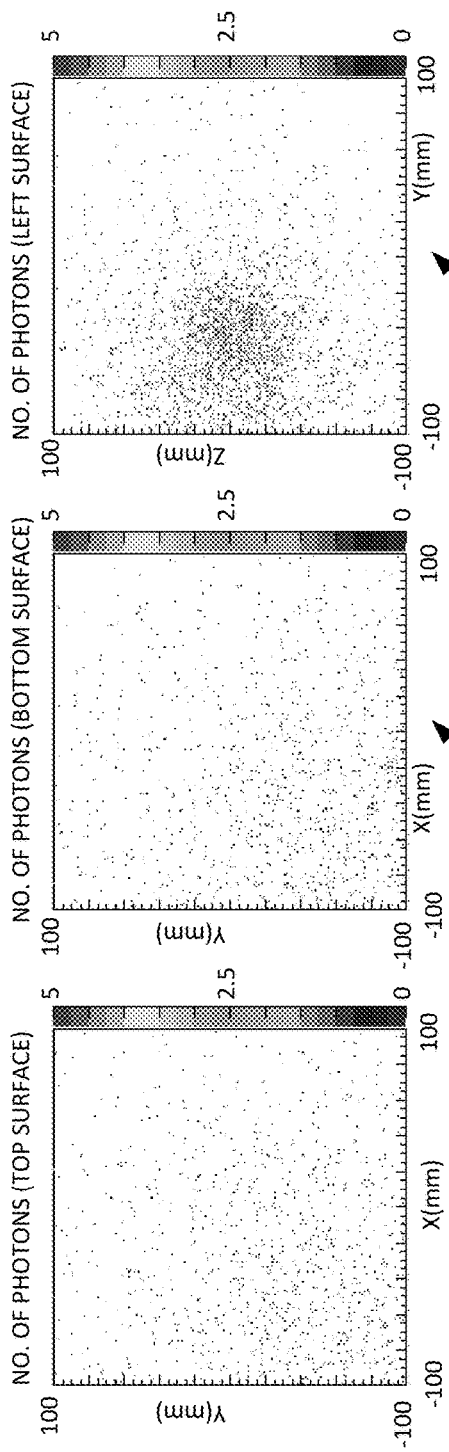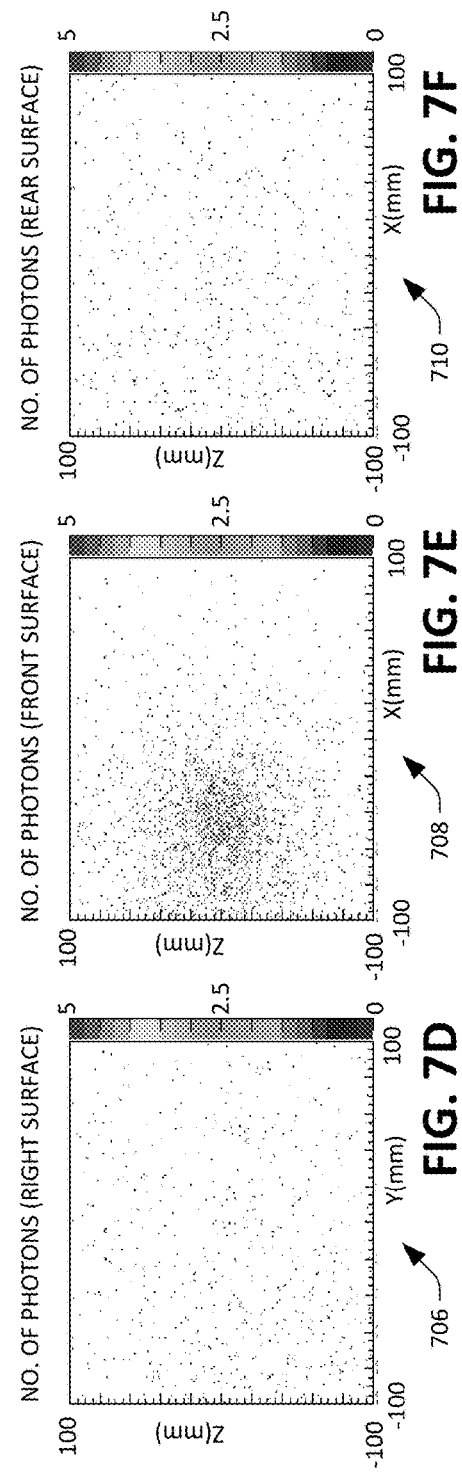

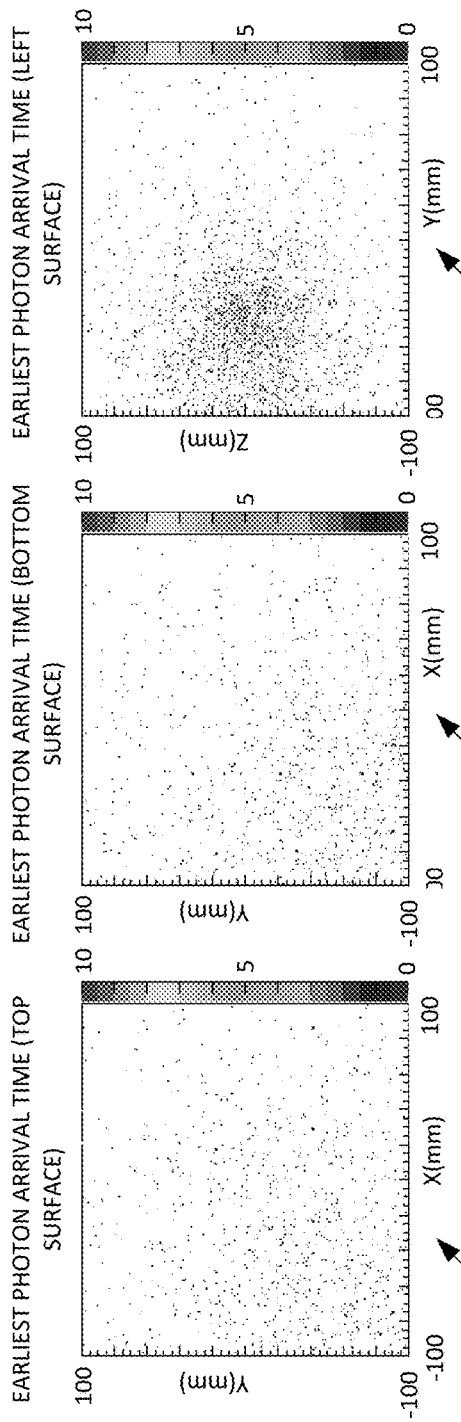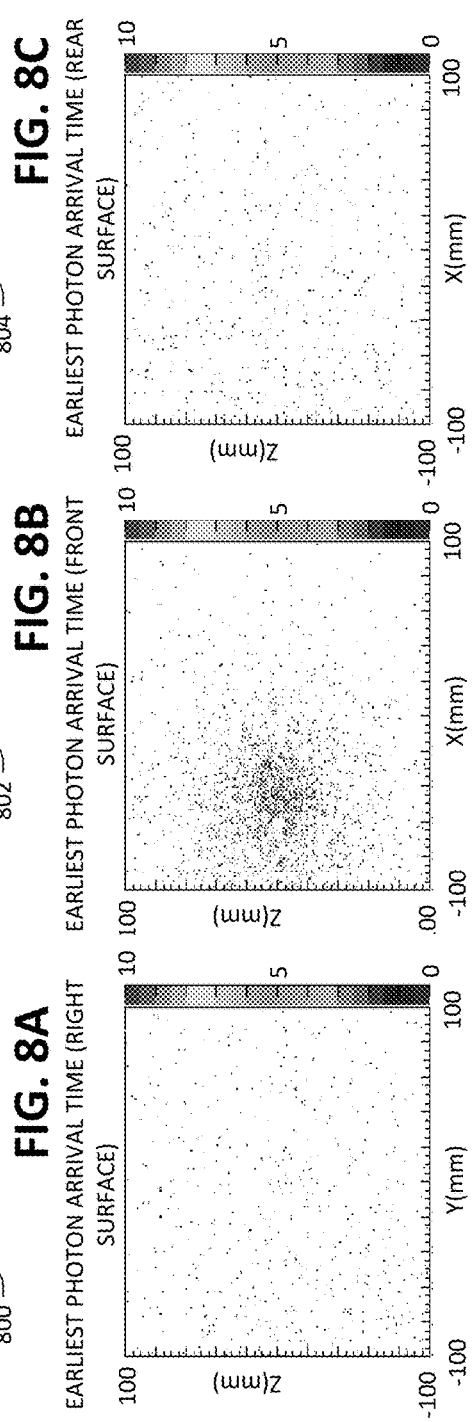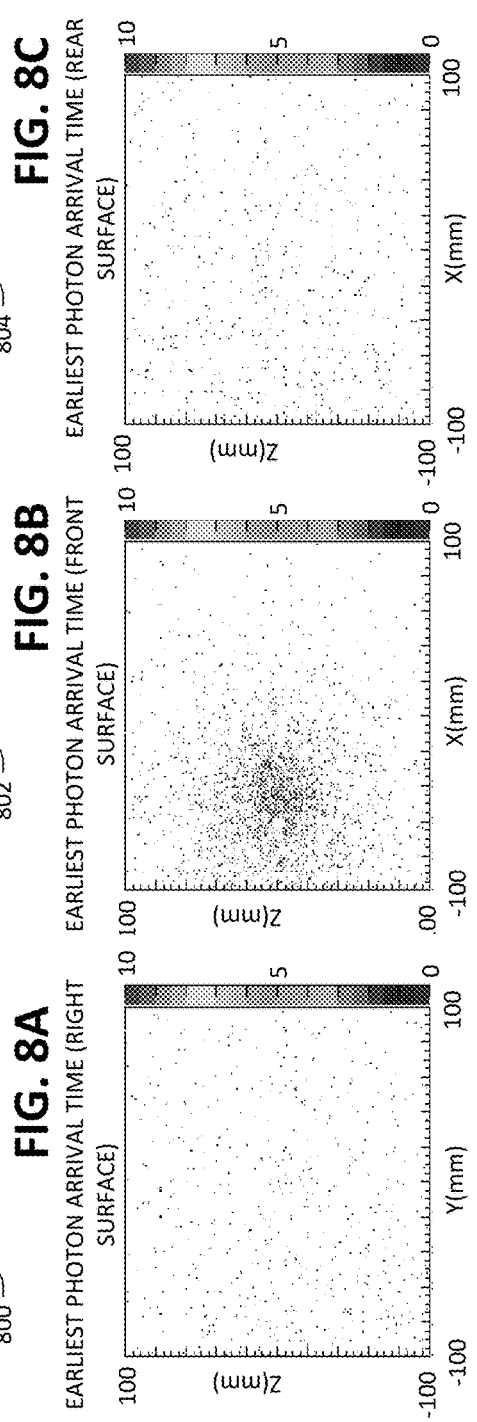

SINGLE VOLUME FISSION ENERGY NEUTRON DETECTOR

BACKGROUND

Fission energy neutrons can act as a sensitive and specific signature for a material that emits such neutrons, due at least partially to low natural backgrounds of fission energy neutrons, penetrating nature of fission energy neutrons, and scarcity of materials that benignly emit fission energy neutrons. Detecting fission energy neutrons may be desirable in several applications, such as, but not limited to, detecting contraband in materials, scanning cargo containers at borders, and verifying conformance with arms control treaties.

Conventional fission energy neutron detection systems tend to be somewhat bulky, and detect fission energy neutrons relatively inefficiently. For instance, an exemplary conventional fission energy neutron detection system utilizes at least two separate scintillator volumes, and which must be positioned relatively precisely with respect to one another. To detect a fission energy neutron utilizing this conventional system, a first interaction between the neutron and scintillator material in one of the scintillator volumes must first be detected, and a second interaction between the neutron and scintillator material in the other of the scintillator volumes must also be detected. Therefore, a relatively low percentage of neutrons that interaction in at least one of the scintillator volumes are detected, as probabilities of detecting two interactions of neutrons in separate scintillator volumes are relatively low.

SUMMARY

The following is a brief summary of subject matter that is described in greater detail herein. This summary is not intended to be limiting as to the scope of the claims.

Described herein are various technologies pertaining to a single volume fission energy neutron detection system, where in contrast to conventional fission energy neutron detection systems, a single scintillator volume can be employed to detect fission energy neutrons emitted from a target. With more particularity, an exemplary single volume fission energy neutron detection system (hereinafter referred to as a "detection system") includes a single volume of scintillator (e.g., a scintillator block). The scintillator block may be composed of any suitable scintillating material, and includes hydrogen, carbon, or the like. The detection system also includes a photodetector that is coupled to the scintillator block. The photodetector has a plurality of detection bins (e.g., cells), wherein a two-dimensional spatial resolution of the detection can be between about 1 mm×1 mm and about 1 cm×1 cm. Furthermore, the photodetector can comprise a readout circuit that can read out values from the detection bins at a temporal resolution between about 1 picosecond and about 1 nanosecond.

The detection system can further include a computing system that receives data read from the detection bins by the readout circuit over time. The computing system, based upon the received data, can reconstruct kinematics of a neutron that interacted with the scintillating material of the scintillator block. Based upon the reconstruction of the kinematics, an energy of the neutron can be estimated, and a location of the material that emitted the neutron can be estimated. After multiple detections (e.g., kinematics of multiple neutrons have been reconstructed), the computing system can generate an image of the material that emitted the neutrons, and some materials can be identified based upon the distribution of energies of emitted neutrons.

With still more particularity, the scintillator block can be positioned relatively proximate to a target of interest, wherein the target may include material that is desirably identified. The material, for example, may emit neutrons, and a neutron emitted from the material can penetrate into the scintillator block and interact with the scintillating material therein at a first interaction location. This interaction is an elastic scattering event, resulting in isotropic emission of photons from the first interaction location. Photons emitted from the first interaction location are detected at the detection bins of the photodetector, and values indicative of light intensity detected at the respective detection bins are provided to the computing system (at the temporal resolution referenced above) by way of the readout circuit.

Subsequently, the neutron may travel elsewhere in the scintillator block and have a subsequent interaction with the scintillating material at a second interaction location, which results in isotropic emission of photons from the second interaction location. Photons emitted from the second interaction location are detected at the detection bins of the photodetector, and values indicative of light intensity detected at the respective bin positions are provided to the computing system by way of the readout circuit. Generally, the above-referenced interactions occur within a few cm from one another (e.g., between 2 cm and 5 cm), and occur between 100 ps and 5 ns from one another, where these values are to be considered representative, and do not indicate strict bounds. Based upon the values read from the detection bins and timestamps assigned thereto, the computing system can detect scattering events that occurred in the scintillator block.

As the spatial resolution of the detection bins is relatively small, and as the temporal resolution for data readout by the readout circuit is relatively small, a sufficient amount of data is acquired to allow for reconstruction of neutron kinematics. In an example, a maximum likelihood fit approach can be undertaken by the computing system to reconstruct the kinematics of neutrons. Accordingly, the detection system described herein can identify fission energy neutrons with improved efficiency compared to conventional detection systems, and can do so with a smaller footprint when compared to conventional detection systems.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 7A-7F are exemplary graphs that illustrate numbers of photons detected by photodetectors at different surfaces of a scintillator block.

FIGS. 8A-8F illustrate earliest times of arrival of photons detected at numerous photodetectors coupled to sides of a scintillator block.

DETAILED DESCRIPTION

Figure 1:
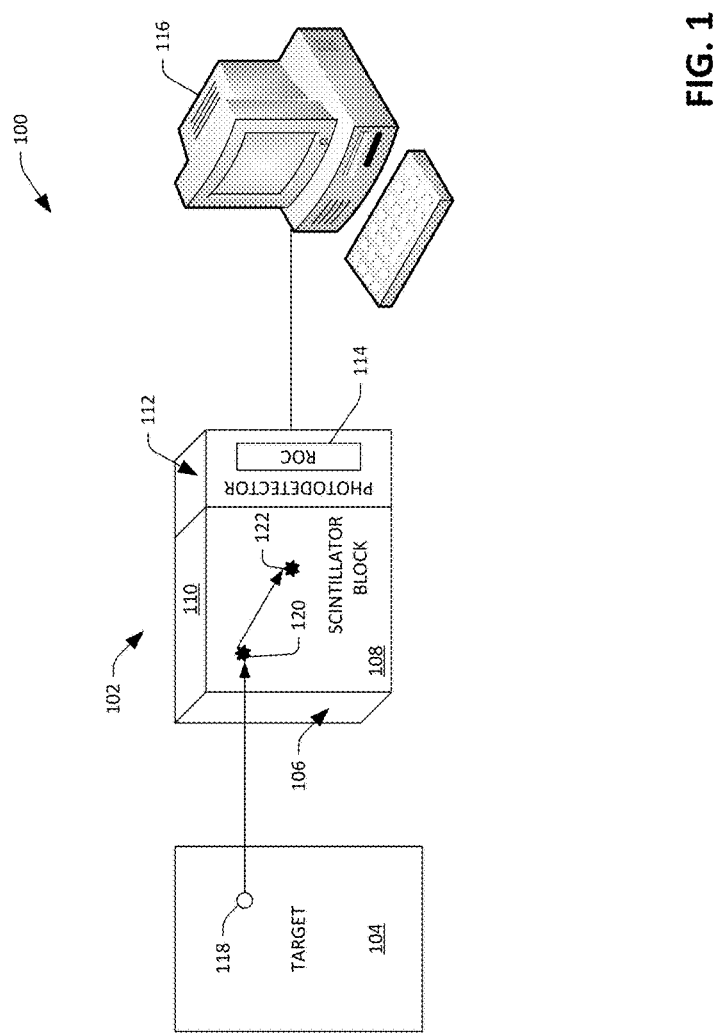
FIG. 1 is a functional block diagram illustrating an exemplary single volume fission energy neutron detection system.

Various technologies pertaining to a single volume fission energy neutron detection system (referred to herein as a "detection system") are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary detection system 100 is illustrated. The detection system 100 comprises a scintillator block 102, which is positioned relative to a target 104 of interest. The target 104 may be or include nuclear material that is desirably detected and/or imaged. Accordingly, the target 104 can be a cargo container, wherein the cargo container is to be scanned for a particular type of nuclear material or types of nuclear materials. In another example, the target 104 may be a weapon that is to be scanned to ensure compliance with an arms treaty. The scintillator block 102 can be composed of any suitable scintillating material. With more particularity, the scintillating material can be composed of a material that includes hydrogen and/or carbon.

The scintillator block 102 includes six surfaces: a left surface 106, a right surface (which opposes the left surface 106), a front surface 108 (which is orthogonal to the left surface 106 and the right surface), a rear surface (which opposes the front surface 108), a top surface 110 (which is orthogonal to the left surface 106, the right surface, the front surface 108, and the rear surface), and a bottom surface (which opposes the top surface 110). In an example, the scintillator block 102 may be a cube or a rectangular cuboid, although the scintillator block 102 may be some other suitable shape. Pursuant to an example, the scintillator block 102 may be an organic scintillator, and can include a liquid scintillator, a plastic scintillator, or some other suitable scintillator.

The detection system 100 further comprises a photodetector 112. The photodetector 112 is shown as being positioned adjacent to the right surface of the scintillator block 102. In other embodiments, the photodetector 112 may be positioned adjacent to other surfaces of the scintillator block 102. Further, the detection system 100 can include more than one photodetector, positioned adjacent to different surfaces of the scintillator block 102. For example, the detection system 100 can include 1-6 photodetectors (e.g., one photodetector for each surface of the scintillator block 102). For purposes of explanation, operation of the system 100 will be described with respect to the photodetector 112 alone.

The photodetector 112 include a plurality of detection bins (which may also be referred to as cells), wherein the detection bins can allow for detecting photons at a spatial resolution on the order of between about 1 mm×1 mm and 1 cm×1 cm. Thus, in an example, when the right surface of the scintillator block 102 is 20 cm×20 cm, the photodetector 112 may include 400 detection bins. When photons impact the photodetector 112 at a detection bin, a charge is generated at the detection bin, wherein the charge is indicative of a number of photons impacting the photodetector 112 at the detection bin. The photodetector 112 can include a readout circuit 114 that scans the detection bins and generates values that are indicative of energies in the detection bins (e.g., reads out values from the detection bins). The readout circuit 114 can utilize any suitable technique for generating values for each detection bin. Further, the readout circuit 114 can be configured to read out values at a relatively small temporal resolution. Pursuant to an example, the readout circuit 114 can read out values from detection bins at a time resolution of between about 100 ps and 1 ns. In a non-limiting example, the photodetector 112 can be a large-area picosecond photodetector (LAPPD), such as one described in Genat, et al., "Development of Large Area, Pico-second Resolution Photo-Detectors and Associated Readout Electronics", Nuclear Science Symposium Conference Record (NSS/MIC), 2011, pages 1-4, the entirety of which is incorporated herein by reference. In an example, the readout circuit 114 can assign timestamps to values read from the detection bins.

The detection system 100 can further include a computing system 116 that is in communication with the readout circuit 114 of the photodetector 112. The computing system 116 may be a desktop computing device, a server computing device, a laptop computing device, a tablet computing device, a mobile telephone, a wearable computing device, a portion of a data center, some combination of devices, etc. The computing system 116 receives data from the readout circuit 114 (e.g., values read out of the detection bins and associated timestamps) and reconstructs kinematics of neutrons that interact in the scintillator block 102 based upon the data received from the readout circuit 114. In another example, the computing system 116 can be configured to assign the timestamps referenced above to the values. The kinematics of the neutrons are indicative of energies of the neutrons, respectively, and location of the material in the target 104 that emitted the neutrons. Accordingly, based upon the reconstructed kinematics of neutrons, the computing system 116 can generate an image of the material in the target 104 (a two-dimensional image). Further, the computing system 116 can identify some materials based upon the distribution of energies of emitted neutrons.

Operation of the detection system will now be described. The scintillator block 102 is positioned relative to the target 104. The target 104 includes material that comprises a neutron 118, where the neutron 118 is emitted from the material in the target 104. The neutron 118 exits the material of the target 104 and penetrates into the scintillator block 102. The neutron 118, subsequent to penetrating into the scintillator block 102, has an elastic interaction 120 (e.g., a scattering event) with the scintillating material of the scintillator block 102 at a first interaction location. When this interaction 120 occurs, photons are isotropically emitted from the first interaction location in the scintillator block 102. A subset of these photons can travel through the scintillator block 102 towards the right surface thereof, where the photons are detected at respective detection bins of the photodetector 112. It is to be understood that a photon emitted from the first interaction location may be attenuated or absorbed as the photon travels through the scintillator block 102. As indicated previously, the readout circuit 114 can be configured to scan the detection bins of the photodetector 112 at a relatively high sampling rate (e.g., 17 GHz, or approximately 60 ps intervals). Resolution on the photon arrival time can be higher than the sampling rate, and is limited by the transmit time spread of the photodetector 112 (e.g., the variation in the time between a photon hitting the photodetector 112 and the signal being produced). In an example, this transmit time spread can be approximately 35 ps. Thus, the photodetector 112 can be configured to generate values with relatively small temporal resolution (e.g., 35 ps-2 ns), thereby generating values that are indicative of number of photons detected at respective detection bins at the temporal resolution reference above. These values are collectively indicative of the first interaction location; timestamps assigned to the values are collectively indicative of the time of occurrence of the first interaction 120.

Subsequent to the interaction 120, the neutron 118 travels in a different direction in the scintillator block 102. The neutron 118 has a second elastic interaction 122 with the scintillating material at a second interaction location in the scintillator block 102. Accordingly, due to the second interaction 122, photons are isotropically emitted from the second interaction location, and a subset of such photons travel through the scintillator block 102 towards the right surface thereof (and other surfaces). The detection bins of the photodetector 112 detect photons that reach the right surface, and the readout circuit 114 reads-out values from the detection bin (and optionally assigns timestamps to the values). These values are collectively indicative of the second interaction location; timestamps assigned to the values are collectively indicative of the time of occurrence of the second interaction 122.

The computing system 116 receives data generated by the photodetector 112 over time (e.g., the values and timestamps corresponding to the interactions 120 and 122). Based upon the data, the computing system 116 can reconstruct the kinematics of the neutron 118. As reference above, the kinematics of the neutron 118 are indicative of an energy of the neutron 118 as well as a location of the material in the target 104 that emitted the neutron 118. After multiple detections (e.g., kinematics of multiple neutrons have been reconstructed), the computing system 116 can generate an image of the material that emitted the neutrons, and some materials can be identified based upon the distribution of energies of emitted neutrons. In an example, the computing system 116 can employ a maximum likelihood fit approach to reconstruct the kinematics of the neutron 118. For instance, the computing system 116 can comprise a statistical model that describes a mapping between elastic scatter events (e.g., the interactions 120 and 122) and values read from the detection bins over time.

The computing system 116 can use other approaches to identify elastic scatter events. For example, the computing system 116 can be configured to first identify scatter event locations and times, and subsequently reconstruct kinematics of neutrons based upon the locations and times. For example, the computing system 116 can be programmed to perform a brute force approach, wherein the relatively granular time resolution of values read out from the detection bins of the photodetector 112 are used to reconstruct the wave front of optical photons emitted in the prompt part of a scintillator pulse. In another exemplary approach, the computing system 116 can be programmed to use coded aperture modulation of the scintillation photons to determine their points of origin. In such an approach, a coded aperture mask (not shown) is included between the scintillator block 102 and the photodetector 112.

Accordingly, in an example, the computing system 116 can identify the first interaction location and the second interaction location in the scintillator block 102 (at a spatial resolution of approximately 1 cm or smaller), and can further identify a time of the first interaction and a time of the second interaction (at a resolution of approximately 1 ns or smaller). Based upon the locations and times of the interactions, the computing system 116 can reconstruct the kinematics of the neutron 118. For example, as the times of the interactions can be ascertained, and as the locations of the interactions can be ascertained, velocity of the neutron 118 as it travels through the scintillator block 102 can be estimated. The velocity can be indicative of the energy of the neutron 118 (e.g., the velocity of the neutron 118 together with energy lost by the neutron 118 in the first interaction can provide an estimate of the energy of the neutron 118). Further, based upon the distance between the interaction locations, the computing system 116 can determine that the interactions 120 and 122 are based upon neutrons rather than gammas. This determination can be made based upon the known velocity of gammas (e.g., the speed of light), while velocity of the neutron 118 will differ. Accordingly, the computing system 116 can filter gamma-based interactions from the data received from the photodetector 112. Finally, based upon the determined reconstructed kinematics of the neutron 118 (and other neutrons emitted from the material in the target 104), the computing system 116 can estimate a location of the material that emits the neutron in the target 104, and can generate an image of the material. This may allow an operator to relatively quickly search a particular area, for example, for nuclear material.

In yet another example, subsequent to the computing system 116 estimating the locations of the interactions 120 and 122, the computing system 116 can utilize a maximum likelihood fit approach to ascertain that the two interaction locations and times correspond to a neutron interacting in the scintillator block 102, and subsequently the computing system 116 can reconstruct the kinematics of the neutron 118.

Figure 2:
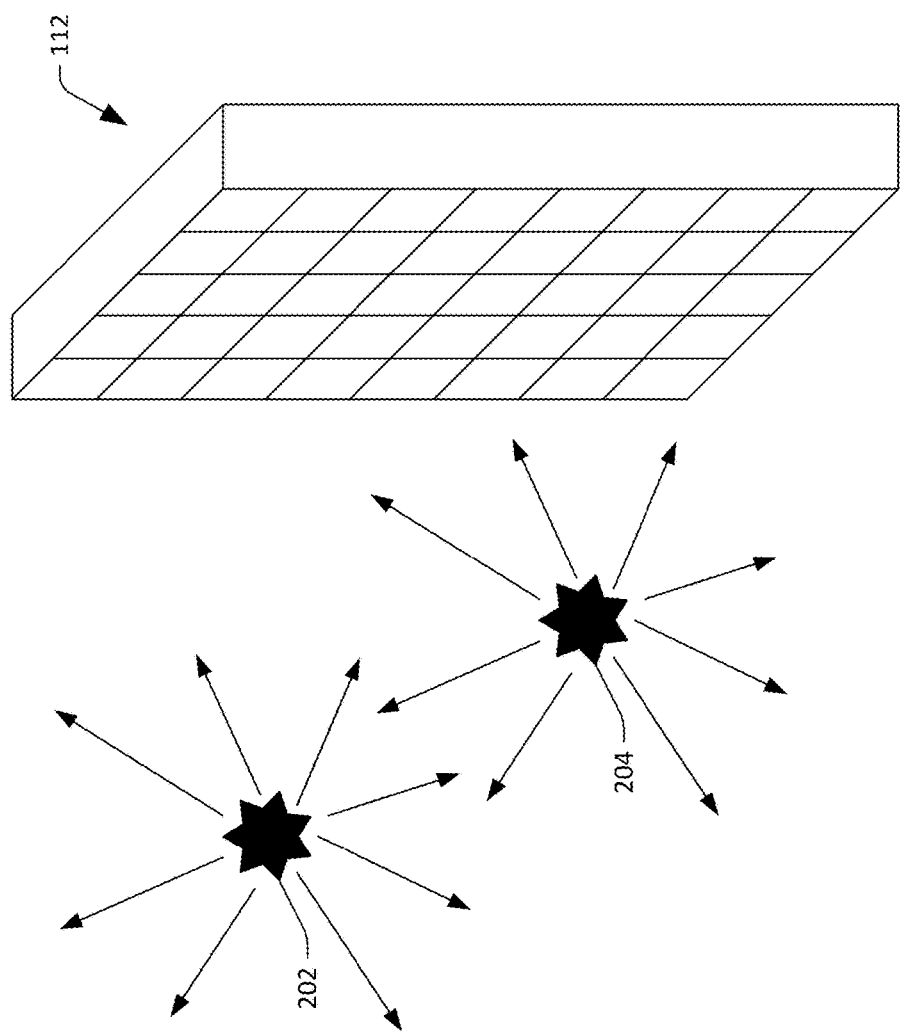
FIG. 2 illustrates an exemplary photodetector that is employed in connection with detecting multiple interactions between a neutron and scintillating material in a scintillator block.

Now referring to FIG. 2, an exemplary depiction of the photodetector 112 is illustrated. As can be ascertained, the photodetector 112 comprises a plurality of detection bins (cells). A first elastic interaction 202 occurs at a first location and a first time in the scintillator block 102, and a second interaction 204 occurs at a second location and a second time in the scintillator block 102. When the first interaction 202 occurs (e.g., when a neutron interacts with the scintillating material), photons are isotropically emitted from the first interaction location. Some of the detection bins of the photodetector 112 can be impacted by photons emitted from the first interaction location when the first interaction occurs. As indicated previously, the readout circuit 114 can read-out values from the detection bins at approximately 1 nanosecond intervals (or smaller). The value read out from a detection bin is indicative of a number of photons that impact the photodetector 112 at the detection bin. Accordingly, based upon the values of the detection bins read out by the readout circuit 114, a location of the first interaction 202 in the scintillator block 102 may be inferred.

Subsequently, when the second interaction 204 occurs at the second location in the scintillator block 102, photons are isotropically emitted from the second location. Again, values read from the detection bins by the readout circuit 114 are indicative of the number of protons that impact the respective detection bins, and are thus indicative of the second location. Thus, the computing system 116 can determine the times and locations of the interactions 202 and 204, and reconstruct kinematics of the neutron based upon the times and locations of the interactions 202 and 204.

Figure 3:
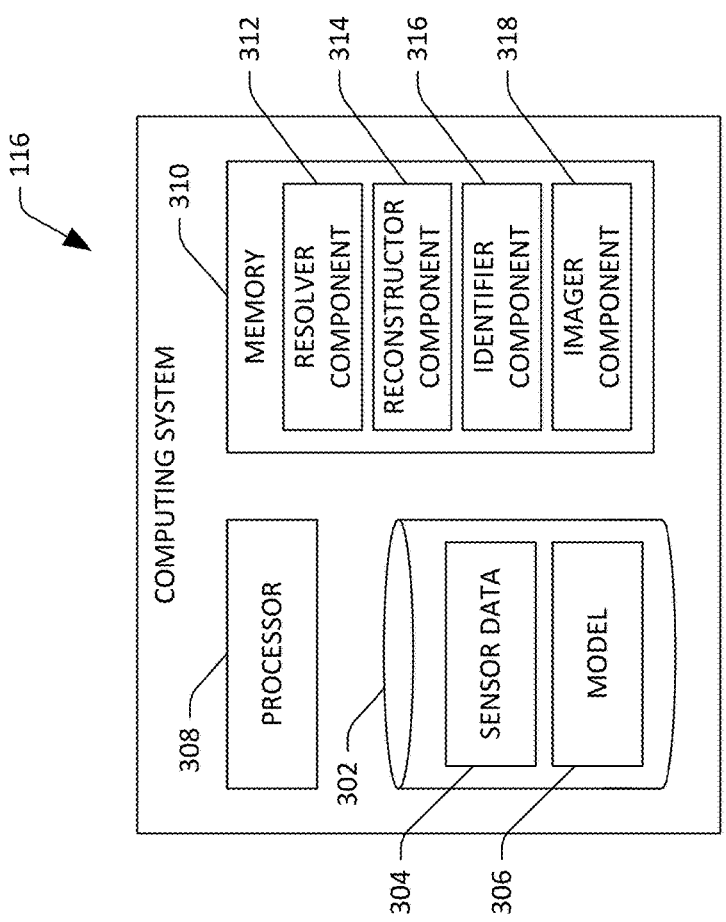
FIG. 3 is a functional block diagram of an exemplary computing system included in the single volume fission energy neutron detection system.

Now referring to FIG. 3, a functional block diagram of the computing system 116 is illustrated. The computing system 116 includes a data store 302, wherein the data store 302 includes sensor data 304 and a statistical model 306 pertaining to neutron scatter events. The sensor data 304 includes values readout from the detection bins of the photodetector 112 by the readout circuit 114 at various granular points in time. The model 306 can statistically represent elastic scatter events for neutrons having certain energy when interacting with scintillating material of the scintillator block 102. Thus, the model 306 can take into consideration: 1) energy of neutrons of interest; 2) composition of the scintillating material; 3) mean and variance with respect to distance between scatter events and time between scatter events, amongst other data.

The computing system 116 additionally includes a processor 308 and a memory 310, wherein the memory 310 includes a plurality of components that are executed by the processor 308. More specifically, the memory 310 includes a resolver component 312 that is configured to receive the sensor data 304 and resolve locations and times of elastic interactions in the scintillator block 102 based upon the sensor data 304. The resolver component 312 can employ a brute force approach to resolve locations of elastic interactions in the scintillator block 102. In another example, the resolver component 312 can use coded aperture modulation to resolve the locations of elastic interactions in the scintillator block 102. In still yet another example, the resolver component 312 can use a maximum likelihood fit algorithm to resolve the locations of elastic interactions in the scintillator block. The resolver component 312 can use timestamps to resolve times of the interactions.

The memory 310 further comprises a reconstructor component 314 that can reconstruct kinematics of a neutron based upon the locations and times of the interactions resolved by the resolver component 312. Further, the reconstructor component 314 can effectively differentiate the elastic interactions, caused by neutrons, from background information, such as elastic interactions caused by gammas. As noted previously, the reconstructor component 314 can utilize a maximum likelihood fit algorithm to reconstruct kinematics of neutrons, wherein the maximum likelihood fit algorithm takes the locations and times of the interactions (estimated by the resolver component 312 into consideration).

The memory 310 can also include an identifier component 316 that can identify a type of material from which neutrons were emitted based upon the kinematics of the neutrons reconstructed by the reconstructor component 314. For example, the computing system 116 can be configured to search for a particular type or types of material(s). When the reconstruct or component 314 is able to reconstruct kinematics of neutrons, which act as signatures for a particular material type, the identifier component 316 can output data that indicates that the material type exists in a target. For instance, the identifier component 316 can cause a binary indication to be presented to an operator, such that the operator can quickly determine whether a cargo container includes material of interest. In another example, the identifier component 316 can output a signal that indicates to a compliance officer that a weapon complies with terms of an arms treaty.

The memory 310 can also include an imager component 318 that can generate an image, wherein the image comprises data that is indicative of a location of the material.

Figure 4:
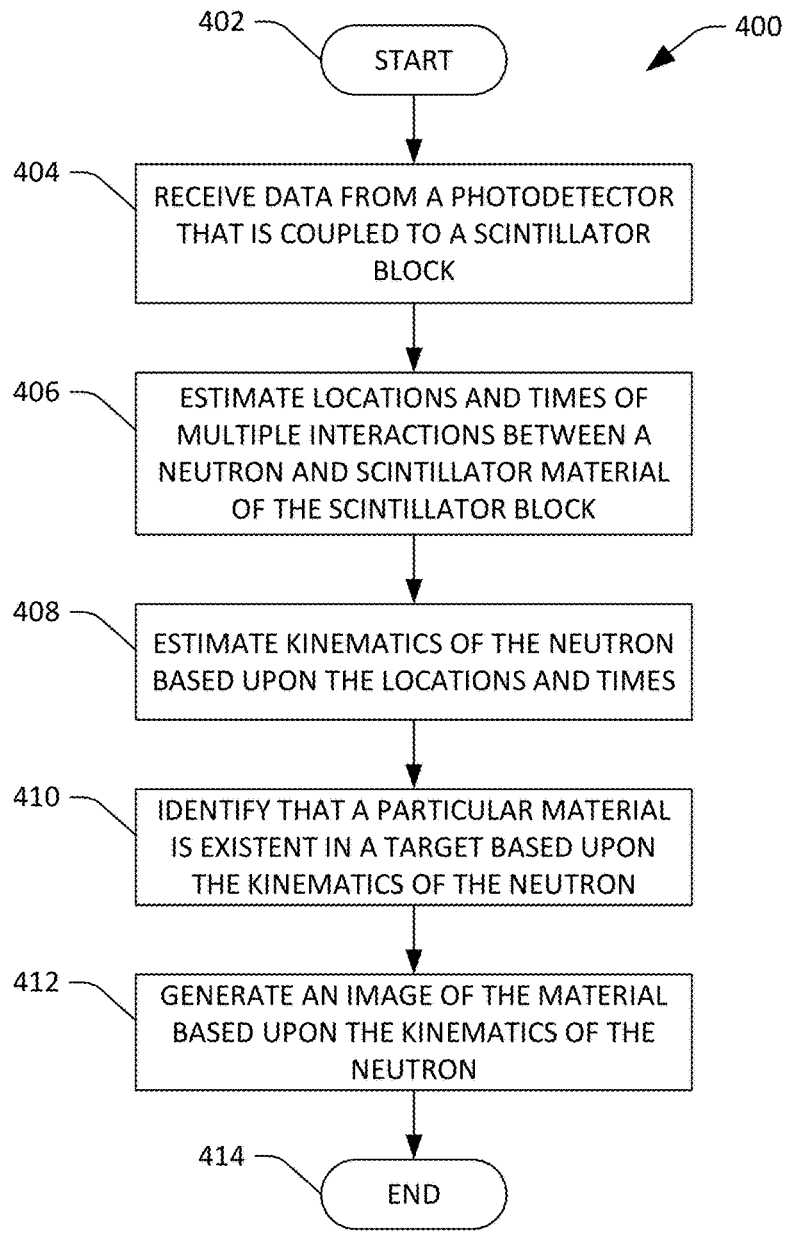
FIG. 4 is a flow diagram that illustrates an exemplary methodology for generating an image of a target based upon reconstructed neutron kinematics.

FIG. 4 illustrates an exemplary methodology relating to detecting fission energy neutrons. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring to FIG. 4, an exemplary methodology 400 that facilitates identifying a particular type of material and/or generating an image that indicates location of the material is illustrated. The methodology 400 starts at 402, and at 404, data is received from a photodetector that is coupled to a scintillator block. The photodetector can generate data having a spatial resolution between about 1 mm×1 mm and about 1 cm×1 cm, and can have a temporal resolution on the order of between 100 ps and 2 ns.

At 406, locations and times of multiple interactions between a fission energy neutron and scintillating material of a scintillator block are estimated. Specifically, the locations and times of the interactions can be estimated based upon the data received from the photodetector. At 408, kinematics of the neutron are estimated based upon the locations and times estimated at 406. At 410, it is identified that a particular material is existent in a target based upon the kinematics of the neutron estimated at 408 (and kinematics of other neutrons detected as interacting in the scintillator block). At 412, an image of the material is generated based upon the kinematics of the neutron (and kinematics of the other neutrons) estimated at 408. The methodology 400 completes at 414.

EXAMPLES

Example 1

An optical photon simulation was conducted to illustrate the concept of scatter event localization using a single scintillator volume. Optical photon transport was simulated in a large volume of liquid scintillator. The scintillator was assumed to emit optical photons from a single position per interaction with a time distribution (pulse shape) as expected for EJ-309. In the simulation, each side of the scintillator volume was either painted black (fully absorbing) or treated as a photodetector. Further, a quantum efficiency of 40% during scintillation was assumed. Detected photon positions and times were recorded and binned according to assumed spatial resolutions of 1 cm×1 cm and 1 mm×1 mm, and binned according to assumed temporal resolutions of 1 ns and 100 ps.

Figures 5A, 5B:
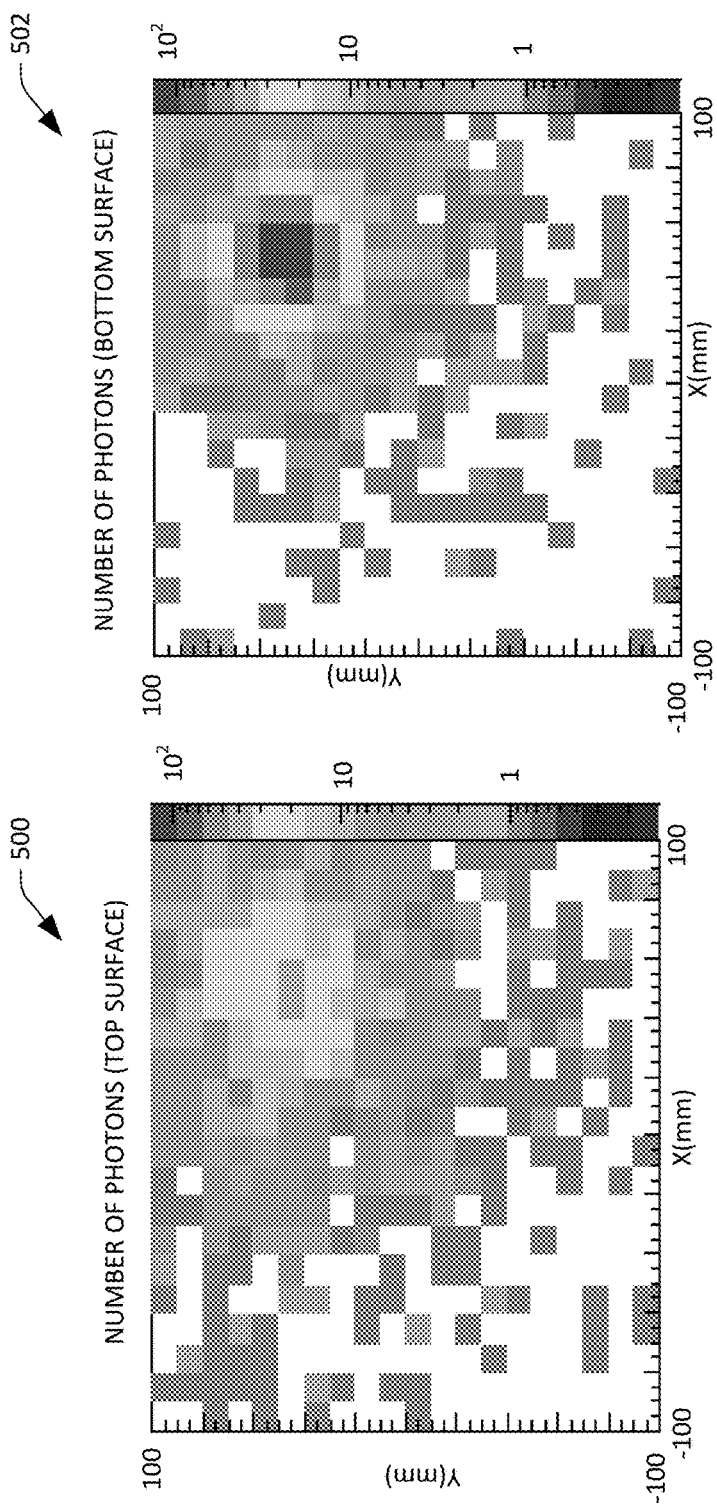
FIGS. 5A and 5B are graphs that illustrate numbers of photons detected by photodetectors positioned at a top surface and a bottom surface of a scintillator block.

The liquid scintillator volume in the simulation was set at 20 cm×20 cm×5 cm. FIGS. 5A and 5B depicts graphs 500 and 502 that respectively illustrate simulation results. More specifically, the graph 500 illustrates a number of photons detected by a first photodetector (for a simulated scatter event) at a first 20 cm×20 cm surface of the scintillator volume (e.g., a top surface), where the first photodetector had 1 cm×1 cm detection bins. The graph 502 illustrates a number of photons detected by a second photodetector (for the scatter event) at a second 20 cm×20 cm surface of the scintillator volume (e.g., a bottom surface), where the second photodetector had 1 cm×1 cm detection bins. The scatter event was simulated at position (50 mm, 50 mm, −10 mm).

Figures 6A, 6B:
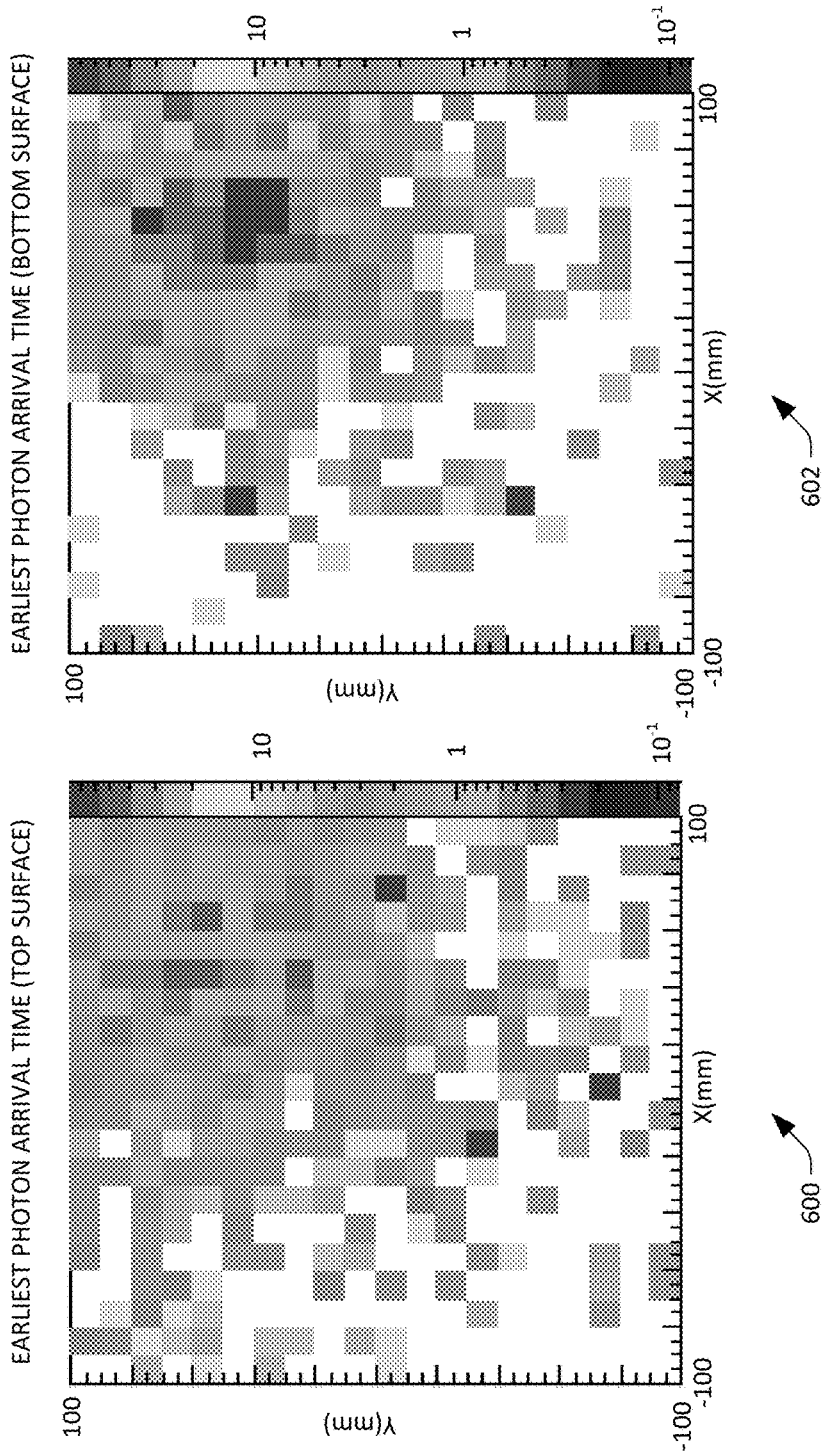
FIGS. 6A and 6B are exemplary graphs that depict earliest times of arrival of photons detected at two photodetectors coupled to a scintillator block.
Figure 9A:
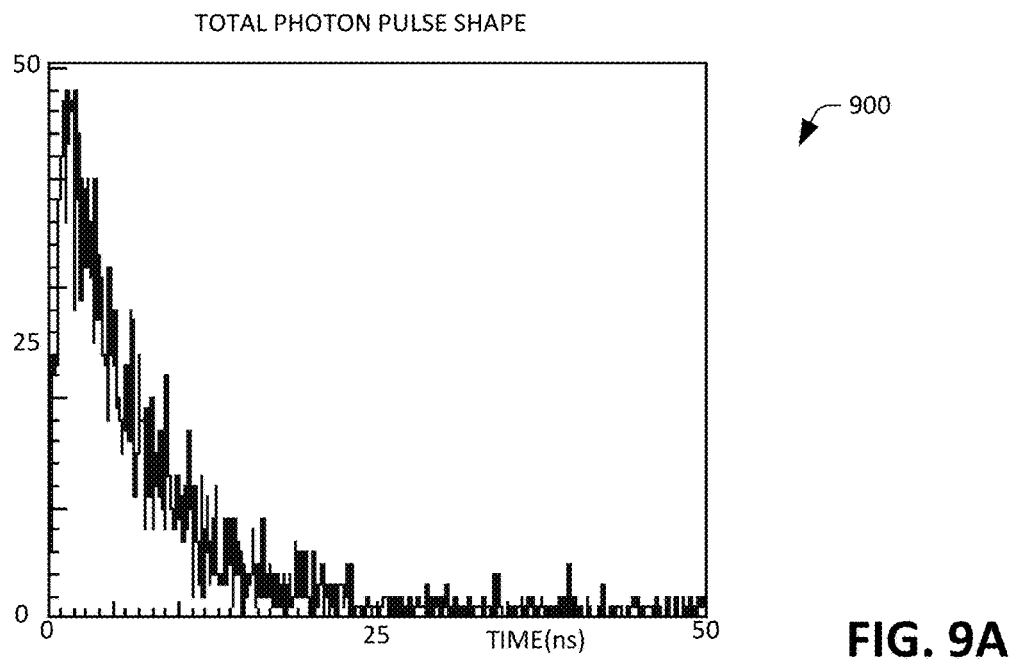
FIGS. 9A-9D are graphs that illustrate exemplary photon pulse shapes.
Figure 9B:
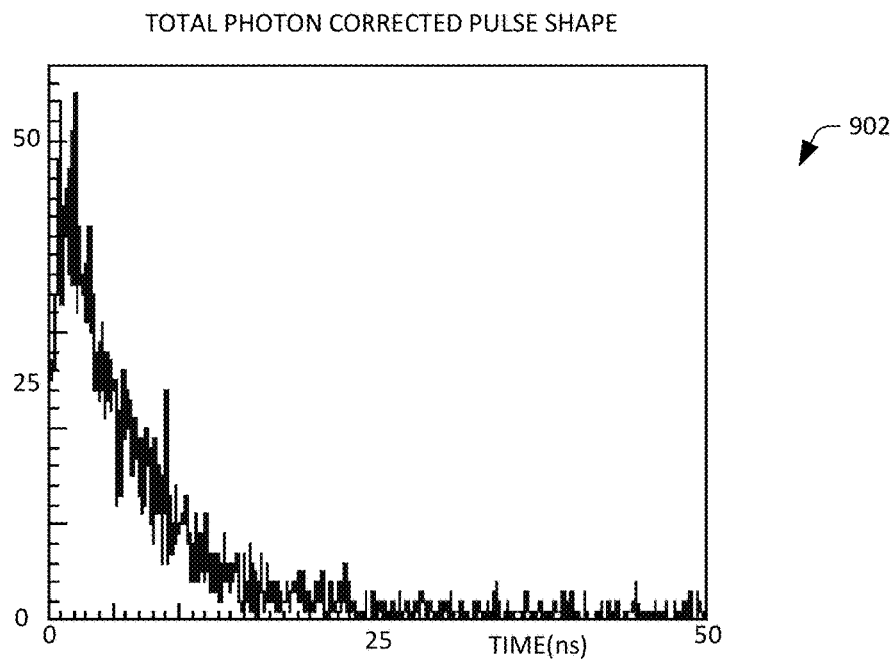
Figure 9C:
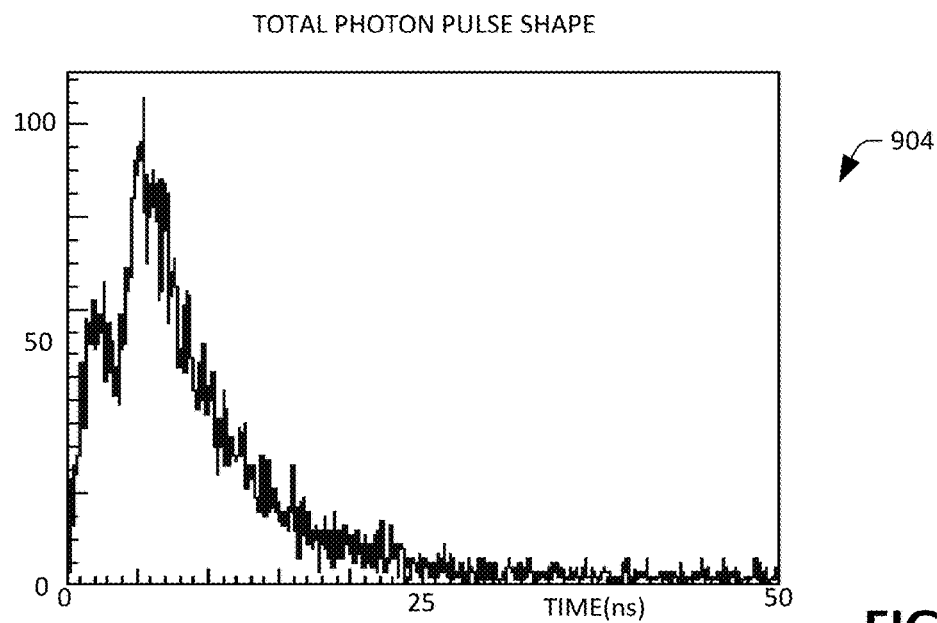
Figure 9D:
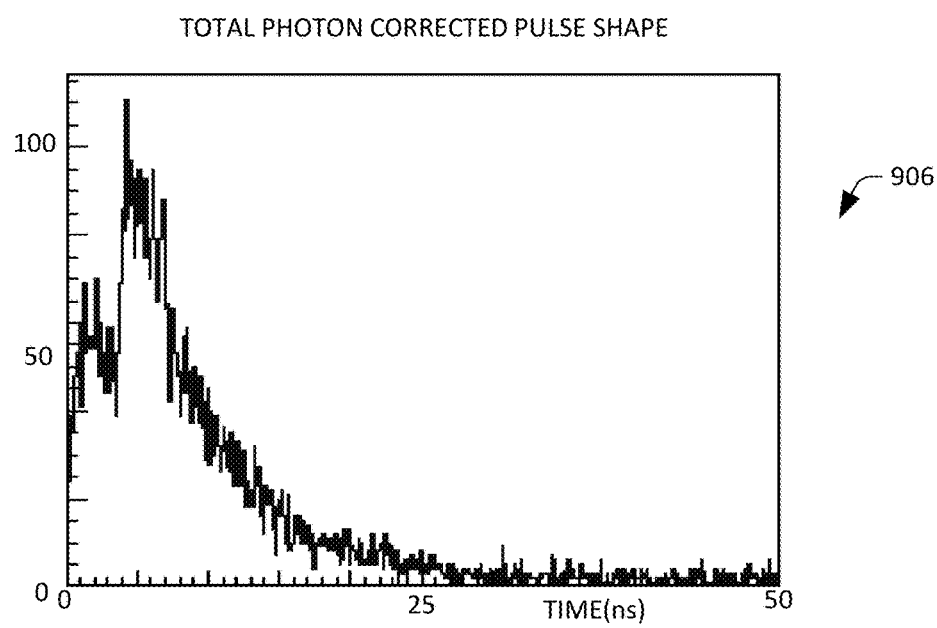

FIGS. 6A and 6B are illustrate graphs 600 and 602 that depict the earliest photon time arrival times in each detection bin of the first and second photodetector, respectively. It can be ascertained that the transverse position of the scatter event manifested itself as the centroid of the photon rate and time distributions. The z position was encoded in the relative rates between the top and bottom detectors.

A fitting routine was implemented to reconstruct the scatter event position based on the photon count distributions (no time information was used), assuming the photon count in a bin is proportional to $p/r^2$, where p is the solid angle subtended by the detection bin. The reconstruction fit was successful, and resolution results are shown for this exemplary configuration (and others) for two energies in Table 1:

TABLE 1

| Scintillator volume size | N photo-detectors | Photo-detector resolution | Deposited energy | Position uncertainty (x, y, z) (mm) | Ang. resolution for typical trajectory |
|---|---|---|---|---|---|
| 20 cm × 20 cm × | 6 | 1 cm × 1 cm; | 1 MeVee | (1.0, 1.0, 1.0) | 5° ($E_n$ = 14 MeV) |

TABLE 1-continued

| Scintillator volume size | N photo-detectors | Photo-detector resolution | Deposited energy | Position uncertainty (x, y, z) (mm) | Ang. resolution for typical trajectory |
|---|---|---|---|---|---|
| 20 cm | | 1 ns | 0.1 MeVee | (3.5, 3.5, 3.4) | 10° ($E_n$ = 1.5 MeV) |
| | | 1 mm × 1 mm; | 1 MeVee | (1.0, 1.0, 1.0) | 2° ($E_n$ = 14 MeV) |
| | | 100 ps | 0.1 MeVee | (3.4, 3.4, 3.3) | 8° ($E_n$ = 1.5 MeV) |
| | 2 (±z) | 1 cm × 1 cm; | 1 MeVee | (3.7, 4.0, 2.4) | 5° ($E_n$ = 14 MeV) |
| | | 1 ns | 0.1 MeVee | (13, 17, 7.6) | 17° ($E_n$ = 1.5 MeV) |
| 20 cm × 20 cm × 5 cm | 2 (±z) | 1 cm × 1 cm; | 1 MeVee | (0.4, 0.4, 0.4) | 5° ($E_n$ = 14 MeV) |
| | | 1 ns | 0.1 MeVee | (1.3, 1.2, 1.2) | 9° ($E_n$ = 1.5 MeV) |

Various experimental and/or hardware assumptions are given in the first four columns. The uncertainty on the fitted position is shown in millimeters in the fifth column for x, y, and z. Again, no timing information was used in this example. The last column in table 1 illustrates the calculated angular resolution for a typical double scatter trajectory having two interactions with the given initial energy.

Example 2

The scintillator volume was set at 20 cm×20 cm×20 cm, with all sides instrumented with photodetectors having 1 mm×1 mm spatial resolution. In this example, two scatter events were simulated. The event positions, times, and energies correspond to a possible neutron tract depositing 1 MeV in two elastic scatters separated by 5 cm.

FIGS. 7A-7F illustrate graphs 700-710 that depict the numbers of photons detected at position bins of the photodetectors at the surfaces of the simulated scintillator block. FIGS. 8A-8E are plots 800-810 that depict earliest times of arrivals of photons at the corresponding detection bins. The higher spatial resolution is notable in the graphs 700-710 and 800-810. The higher spatial resolution, however, was found to be somewhat inconsequential in the reconstructed position uncertainty, as can be seen in Table 1, by comparing the top four rows. It can be noted that the timing of the two events (the first close to the front surface and the second close to the left surface) can be distinguished in the graphs 800-810 shown in FIGS. 8A-8F.

Also, as shown in Table 1, the expected angular resolution for a typical neutron trajectory was calculated, wherein the neutron trajectory is based upon two interactions with 1) the given deposited energy; 2) position uncertainty from the fit described above; and 3) 5 cm separation. A 14 MeV neutron was assumed for the case with large (1.0 MeVee≈3.5 MeV proton recoil) deposited energy, and a 1.5 MeV neutron was assumed to the case with low (0.1 MeVee≈0.5 MeV proton recoil) deposited energy. For the photodetector with 1 cm×1 cm spatial resolution, 1 ns time resolution was assumed. For the photodetector with 1 mm×1 mm spatial resolution, 100 ps time resolution was assumed. Finally, FIGS. 9A-9D depict graphs 900-906 that illustrate pulse shape integrated over all detection bins of the six detectors, first using the time of detection of the optical photons, then after correcting for photon flight times from the interaction position to the detection bin. As can be ascertained, the two interactions can be discerned in at least the graphs 704, 708, 804, and 808.

Example 3

A simulation was performed to estimate the potential efficiency improvements achievable with a single volume fission energy neutron detection system (e.g., the detection system 100) relative to a conventional fission energy neutron detection system. A pencil beam of neutrons with a fission spectrum was fired at the center of a 20 cm×20 cm×20 cm scintillator volume in the single volume detector, and a pencil beam of neutrons with a fission spectrum was similarly fired at the center of one of several scintillator volumes in a multi-volume detector (e.g., in the front plane). Since it remains to be seen what the minimum separation at which interactions can be resolved in the single volume camera, the simulated data was analyzed as a function of the distance between the first two interactions.

A significant improvement in the potential efficiency was observed for the single volume detector. For example, for a 2 cm minimum interaction spacing, a number of potentially detectable events is slightly over an order of magnitude higher compared to a conventional system. Further, an ancillary advantage of the system 100 is its greatly reduced volume and footprint. For roughly the same scintillator volume as the conventional system, use of the same amount of scintillator material would provide much greater effective area with a conceivable footprint of about 50 cm×50 cm, including auxiliary equipment, such as a compact computer for readout and data storage. In contrast, a conventional system has a footprint of about 95 cm×180 cm, not including a separate electronics rack.

Figure 10:
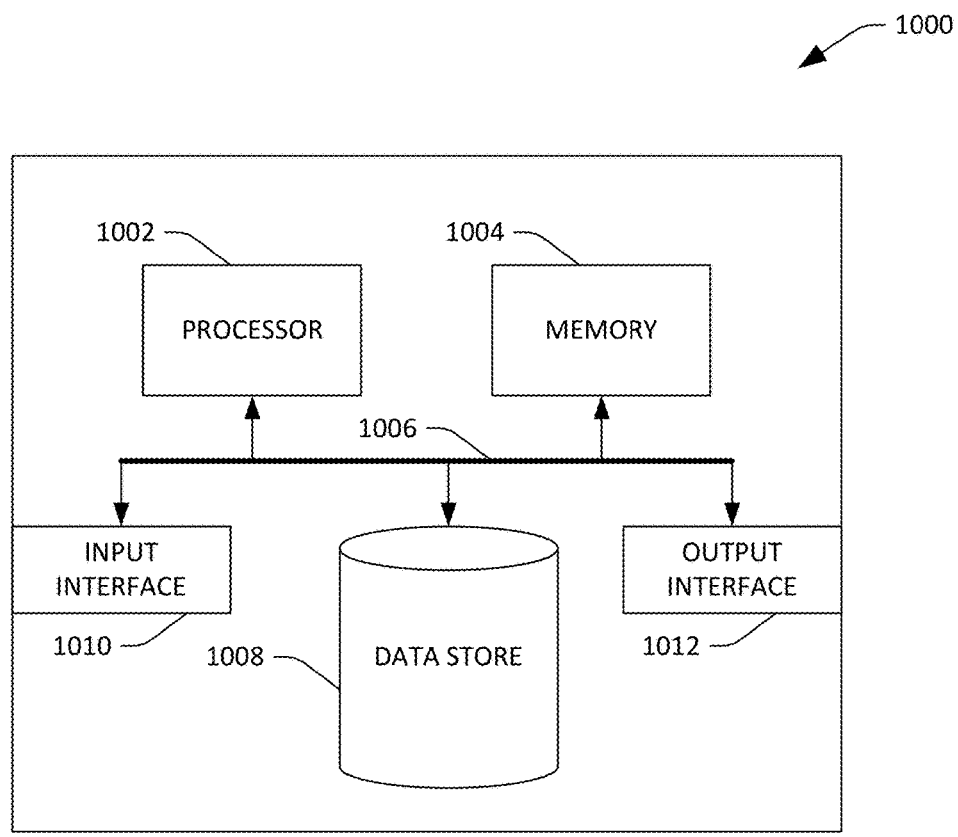
FIG. 10 is an exemplary computing system.

Referring now to FIG. 10, a high-level illustration of an exemplary computing device 1000 that can be used in accordance with the systems and methodologies disclosed herein is illustrated. For instance, the computing device 1000 may be used in a system that determines that a material is of a particular type. By way of another example, the computing device 1000 can be used in a system that generates an image of nuclear material in a target. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store a statistical model, sensor data, etc.

The computing device 1000 additionally includes a data store 1008 that is accessible by the processor 1002 by way of the system bus 1006. The data store 1008 may include executable instructions, a statistical model, sensor data, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A single volume fission energy neutron detection system, the system comprising:
   a scintillator block;
   a photodetector, wherein the photodetector is located adjacent to the scintillator block, the photodetector comprises:
      detection bins; and
      a readout circuit that reads respective values from the position bins; and
   a computing system that is configured to estimate kinematics of a neutron that has interacted with scintillating material of the scintillator block at least twice, the computing system estimates the kinematics of the neutron based upon the respective values from the detection bins read out by the readout circuit, the kinematics of the neutron indicative of:
      a type of material of a target from which the neutron was emitted; and
      a location of the target relative to the scintillator block.

2. The system of claim 1, the computing system is further configured to output data that identifies the type of the material of the target based upon the kinematics of the neutron.

3. The system of claim 1, the computing system is further configured to generate an image of the target based upon the kinematics of the neutron.

4. The system of claim 1, the readout circuit is configured to readout values from detection bins at a time resolution of between 35 picoseconds and 2 nanoseconds.

5. The system of claim 1, the scintillator block comprises an organic scintillator.

6. The system of claim 1, wherein the computing system is configured to estimate locations of interactions of the neutron in the scintillator block based upon the values from the detection bins read out by the readout circuit, the computing system configured to estimate the kinematics of the neutron based upon the locations of the interactions of the neutron in the scintillator block.

7. The system of claim 1, wherein the computing system is configured to estimate times of interactions of the neutron in the scintillator block based upon the values from the detection bins read out by the readout circuit, the computing system configured to estimate the kinematics of the neutron based upon the times of the interactions of the neutron in the scintillator block.

8. The system of claim 1, wherein resolution of the detection bins is between about 1 mm×1 mm and about 1 cm×1 cm.

9. The system of claim 1, wherein the computing system is configured to execute a maximum likelihood fit algorithm to estimate the kinematics of the neutron.

10. The system of claim 1, wherein the computing system disambiguates between gamma interactions and neutron interactions based upon the values read from the detection bins by the readout circuit.

11. The system of claim 1, further comprising at least one other photodetector, the at least one other photodetector positioned orthogonal to the photodetector.

12. The system of claim 1, further comprising at least one other photodetector, the at least one other photodetector positioned on an opposing side of the scintillator block from the photodetector.

13. A method executed by a computing system, the method comprising:
    receiving data from a photodetector;
    estimating, by a processor, respective locations of interactions of a neutron in a scintillator block based upon the data received from the photodetector, wherein the scintillator is located adjacent to the photodetector; and
    estimating, by the processor, kinematics of the neutron based upon the estimated location of interactions of the neutron in the scintillator block, wherein the kinematics of the neutron are indicative of:
       a type of material of a target from which the neutron was emitted; and
       a location of the target relative to the scintillator block.

14. The method of claim 13, further comprising:
    estimating respective times of the interactions of the neutron in the scintillator block based upon the data received from the photodetector; and
    estimating the kinematics of the neutron based upon the estimated times of the interactions of the neutron in the scintillator block.

15. The method of claim 14, wherein the data received from the photodetector comprises first data pertaining to a first interaction between the neutron and the scintillator block and second data pertaining to a second interaction between the neutron and the scintillator block, and further wherein estimating the kinematics of the neutron comprises:
    estimating a velocity of the neutron between the first interaction and the second interaction based upon a first location of the first interaction and a second location of the second interaction and a first time of the first interaction and a second time of the second interaction, wherein the first time and first location of the first interaction are determined based upon a first volume of photons captured by a plurality of detection bins included in the photodetector and the second time and second location of the second interaction are determined based upon a second volume of photons captured by the plurality of detection bins included in the photodetector.

16. The method of claim 15, further comprising identifying the type of material of the target based upon the velocity of the neutron between the first interaction and the second interaction in the scintillator block.

17. The method of claim 13, further comprising:
    generating an image that is indicative of a location of the target from which the neutron was emitted.

18. The method of claim 13, wherein a maximum likelihood fit algorithm is used to estimate the locations of the interactions.

19. The method of claim 13, where coded aperture imaging is used to estimate the locations of the interactions.

20. A computer-readable storage medium comprising instructions that, when executed by a processor, cause the processor to perform acts comprising:
    receiving data from a photodetector that is adjacent to a surface of a scintillator block; and
    reconstructing kinematics of a neutron that interacted multiple times with scintillating material in the scintillator block, the reconstructing based upon the data received from the photodetector, the kinematics indicative of a location of a material from which the neutron was emitted.

\* \* \* \* \*